(12) United States Patent
Kim et al.

(10) Patent No.: US 8,451,319 B2
(45) Date of Patent: May 28, 2013

(54) METHOD AND SYSTEM FOR REMOVING REDUNDANCY FROM AMONG PANORAMIC IMAGES, AND COMPUTER-READABLE RECORDING MEDIUM

(75) Inventors: Tae Hoon Kim, Gyeonggi-do (KR); Jung Hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/375,219

(22) PCT Filed: Sep. 6, 2010

(86) PCT No.: PCT/KR2010/006049
§ 371 (c)(1),
(2), (4) Date: Nov. 29, 2011

(87) PCT Pub. No.: WO2011/034306
PCT Pub. Date: Mar. 24, 2011

(65) Prior Publication Data
US 2012/0075415 A1    Mar. 29, 2012

(30) Foreign Application Priority Data

Sep. 16, 2009   (KR) .................. 10-2009-0087796

(51) Int. Cl.
*H04N 7/12*        (2006.01)
(52) U.S. Cl.
USPC ......................................................... 348/36
(58) Field of Classification Search
USPC ................................................ 348/36; 352/69
See application file for complete search history.

(56) References Cited

U.S. PATENT DOCUMENTS

| | | | | |
|---|---|---|---|---|
| 6,968,084 | B2* | 11/2005 | Satoh | 382/190 |
| 7,542,073 | B2* | 6/2009 | Li et al. | 348/218.1 |
| 7,711,262 | B2* | 5/2010 | Park et al. | 396/296 |
| 7,734,116 | B2* | 6/2010 | Panabaker et al. | 382/284 |
| 2005/0004897 | A1* | 1/2005 | Lipson et al. | 707/3 |
| 2005/0264650 | A1* | 12/2005 | Park et al. | 348/36 |
| 2008/0143727 | A1* | 6/2008 | Oh et al. | 345/474 |
| 2008/0211902 | A1* | 9/2008 | Ayaki | 348/36 |
| 2008/0266408 | A1* | 10/2008 | Kim | 348/218.1 |
| 2010/0118116 | A1* | 5/2010 | Tomasz et al. | 348/36 |

FOREIGN PATENT DOCUMENTS

| | | |
|---|---|---|
| KR | 10-2008-0028698 A | 4/2008 |
| KR | 10-2008-0096006 A | 10/2008 |

OTHER PUBLICATIONS

"Construction of Panoramic Image with Distance Information" Phonsuel et al., SICE-ICASE International Joint Conference 2006 Oct. 18-21, 2006 in Bexco, Busan, Korea.*

* cited by examiner

*Primary Examiner* — Mehrdad Dastouri
*Assistant Examiner* — Mohammed Rahaman
(74) *Attorney, Agent, or Firm* — Blakely, Sokoloff, Taylor & Zafman LLP (57) ABSTRACT

The present invention includes a method for removing redundancy of panoramic images. The method includes the steps of: (a) specifying respective locations of multiple panoramic images by referring to respective shooting places of the multiple panoramic images; (b) recognizing a specific object included in each of at least two panoramic images as the identical object by referring to the respective locations of the multiple panoramic images and respective directions of the specific object therein; and (c) determining top n images of the specific object considered to have top n degrees of precision in an image matching process among all the object images which are recognized as the identical object as a reference image(s) for the specific object.

17 Claims, 6 Drawing Sheets

METHOD AND SYSTEM FOR REMOVING REDUNDANCY FROM AMONG PANORAMIC IMAGES, AND COMPUTER-READABLE RECORDING MEDIUM

CROSS REFERENCE TO RELATED APPLICATIONS

This application is a U.S. National Phase Application of International Application PCT Application No. PCT/KR2010/006049 filed on Sep. 6, 2010, which claims the benefit of priority from Korean Patent Application No. 10-2009-0087796 filed on Sep. 16, 2009. The disclosures of International Application PCT Application No. PCT/KR2010/006049 and Korean Patent Application No. 10-2009-0087796 are incorporated herein by reference.

FIELD OF THE INVENTION

The present invention relates to a method, a system and a computer-readable recording medium for removing redundancy of panoramic images; and more particularly, to the method, the system and the computer-readable recording medium for storing as a reference image(s) only an image(s), which includes a specific, object in a high resolution or contains a front view of the specific object showing its features more precisely, among multiple panoramic images shot at various places, thereby saving a storage space and improving operation speed for image matching.

BACKGROUND OF THE INVENTION

Recently, due to the wide spread use of the Internet, it has been common to provide information converted to a digital form. Typical examples of digitalized geographic information may include online map services, car navigation systems, etc. As such, one of benefits of the digitalized geographic information is to provide a variety of convenient functions for users by combining them with user interfaces capable of providing a retrieval function. Further, changes in geographic information may be easily updated through remote updating services, etc., so that, in the aspect of latest geographic information, such digital data may be predominant over conventional printed materials.

However, it has been conventionally common for service providers to combine digital maps generated by the combination of simple symbols with search interfaces and provide digital geographic information, but since there are apparent differences between information of areas displayed on the digital map and real information of the areas, it is difficult to identify the real information of the areas from the digital map.

As an attempt to solve such a problem, US Laid-Open Publication No. 2008-143727 dated Jun. 19, 2008 discloses a technology for providing a panoramic image(s) relating to a certain place such as a bystreet, a road, etc. appearing on the digital map and, if a user selects a specific pixel with an arrow, etc. on the panoramic image, offering data of a different panoramic image corresponding to a place shown at the specific pixel. Accordingly, users may identify real information of the certain place on the digital map and inquire for another panoramic image which expresses geographic information at the certain place shown on the panoramic image the user is now inquiring for in a more detail through a link between panoramic images.

In addition, a technology which performs visual search by using a panoramic image(s) has been introduced. According to the technology, by referring to a queried image inputted by a user, it may retrieve an appropriate panoramic image including what is similar to the object included in the queried image among multiple panoramic images and provide the appropriate panoramic image to the user.

However, according to the technology of performing visual search by using the panoramic images, since large-capacity high-resolution images of all objects included on all the panoramic images must be stored on a database to provide a result of retrieval matched to the queried image and operations for comparing the queried image with all the high-definition images stored in the database must be performed, an excessively large storage space is required and the execution time for the comparing operations becomes more increased.

SUMMARY OF THE INVENTION

It is, therefore, an object of the present invention to solve all the problems mentioned above.

It is another object of the present invention to store, as a reference image (s) for a specific object, only an image (s) which shows features of the specific object more precisely such as a high-resolution panoramic image with the specific object or a panoramic image showing the front of the specific object among images of the specific object in multiple panoramic images shot in different places to thereby remove the redundancy of the multiple panoramic images.

In accordance with one aspect of the present invention, there is provided a method for removing redundancy of panoramic images, including the steps of: (a) specifying respective locations of multiple panoramic images by referring to respective shooting places of the multiple panoramic images; (b) recognizing a specific object included in each of at least two panoramic images as the identical object by referring to the respective locations of the multiple panoramic images and respective directions of the specific object therein; and (c) determining top n images of the specific object considered to have top n degrees of precision in an image matching process among all the object images which are recognized as the identical object as a reference image(s) for the specific object.

In accordance with one aspect of the present invention, there is provided a system for removing redundancy of panoramic images, including: a location specifying part for specifying respective locations of multiple panoramic images by referring to respective shooting places of the multiple panoramic images; an identical object recognition part for recognizing a specific object included in each of at least two panoramic images as the identical object by referring to the respective locations of the multiple panoramic images and respective directions of the specific object therein, and a redundancy removing part for determining top n object images of the specific object considered to have top n degrees of precision in an image matching process among all the object images which are recognized as the identical object as a reference image(s) of the specific object.

BRIEF DESCRIPTION OF THE DRAWINGS

The above objects and features of the present invention will become more apparent from the following description of the preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specified embodiments in which the present invention may be practiced. These embodiments are described in sufficient detail to enable those skilled in the art to practice the present invention. It is to be understood that the various embodiments of the present invention, although different from one another, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

Herein, a panoramic image means an image acquired as a result of photographing a complete view from a point and more particularly, a type of the image capable of offering visual information on all directions actually shown at a shooting point three-dimensionally and realistically by expressing pixels constructing the image on a virtual celestial sphere whose center is the shooting point according to spherical coordinates. Further, the panoramic image may be an image expressing the pixels constructing the image according to cylindrical coordinates.

Configuration of Terminal

Figure 1:
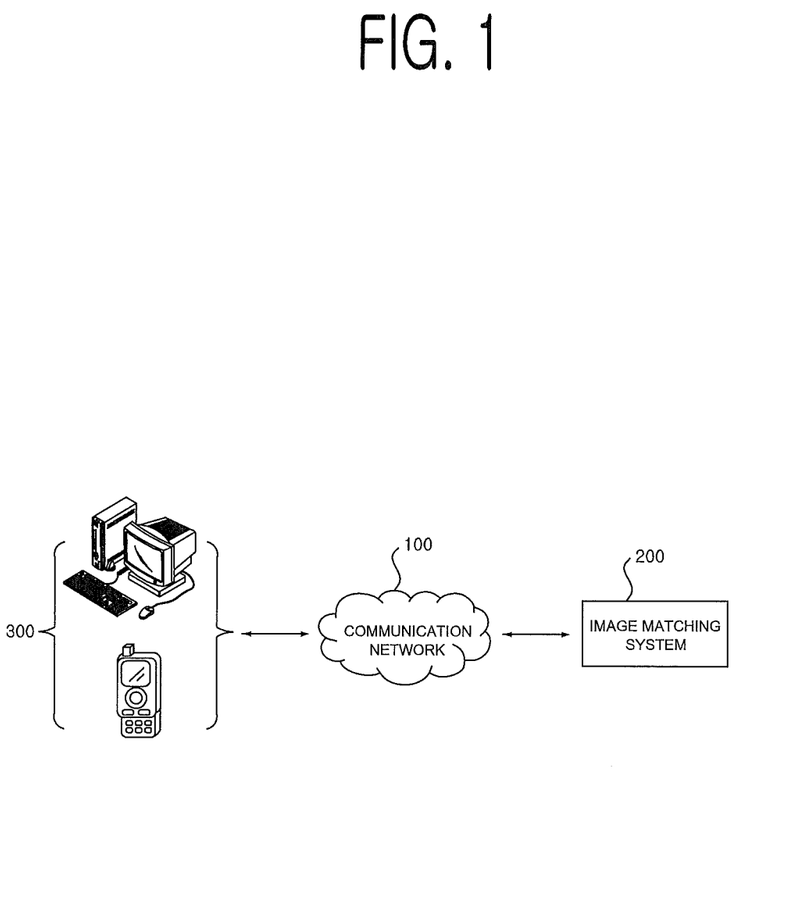
FIG. 1 is a diagram exemplarily presenting a configuration of an entire system for providing an image matching service by using panoramic images in accordance with an example embodiment of the present invention.

FIG. 1 exemplarily presents a configuration of an entire system for providing an image matching service to remove redundancy of panoramic images in accordance with an example embodiment of the present invention.

As illustrated in FIG. 1, the entire system in accordance with an example embodiment of the present invention may include a communication network 100, an image matching system 200 which removes redundancy of panoramic images to provide an image matching service, and a user terminal 300.

First, the communication network 100 in accordance with an example embodiment of the present invention may be configured regardless of wired or wireless and may be configured in a variety of communication networks including a local area network (LAN), a metropolitan area network (MAN), a wide area network (WAN), etc. More preferentially, the communication network 100 in the present invention may be World Wide Web (www).

To provide a visual search service through the user terminal 300 by using panoramic images, the image matching system 200 in accordance with an example embodiment of the present invention may (i) select only an image (s) which shows features of a specific object more precisely such as a high-resolution image with the specific object or an image showing the front of the specific object among images of the specific object included in multiple panoramic images shot in different places, (ii) determine the selected image(s) as a reference image(s) for the specific object, and (iii) store only the reference image (s) onto a database to be used for image matching, wherein there may be one or more reference image (s), if necessary. The internal configuration of the image matching system 200 will be explained in detail below.

Furthermore, the user terminal 300 in accordance with an example embodiment of the present invention is a digital device which includes a function for enabling a user to access the image matching system 200 and communicate with it. Such digital devices, including a personal computer (e.g., desktop, laptop, etc.), a workstation, a PDA, a web pad, a cellular phone, etc., which have memory means and micro processors with a calculation ability, may be adopted as the user terminal 300 in accordance with the present invention.

Configuration of the Image Matching System

Below is a detailed explanation on the internal configuration of the image matching system 200 and its components to implement the present invention.

Figure 2:
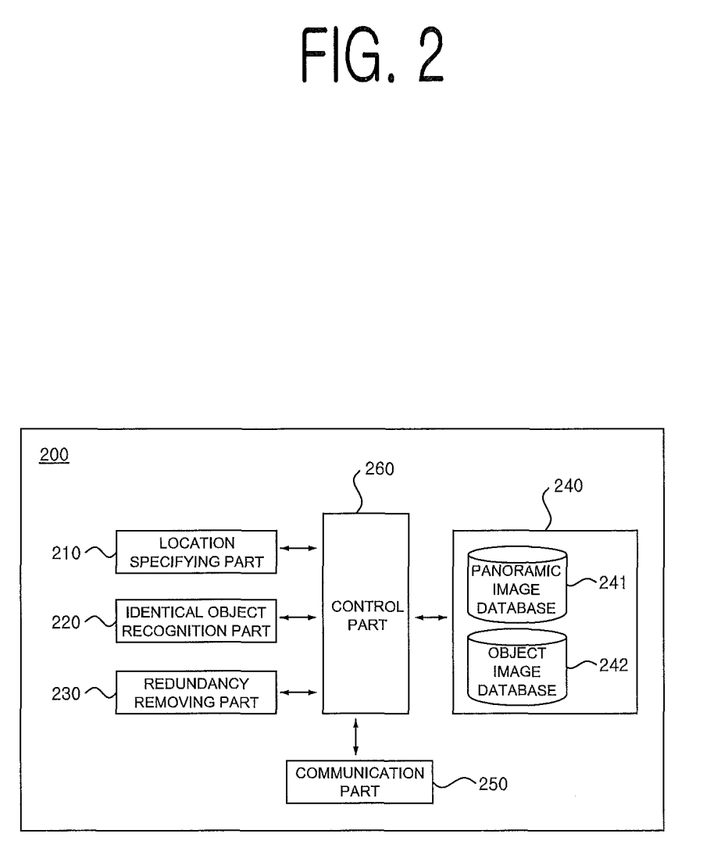
FIG. 2 is a drawing exemplarily presenting an internal configuration of the image matching system in accordance with an example embodiment of the present invention.

FIG. 2 is a drawing exemplarily presenting the internal configuration of the image matching system 200 in accordance with an example embodiment of the present invention.

By referring to FIG. 2, the image matching system 200 in accordance with an example embodiment of the present invention may include a location specifying part 210, an identical object recognition part 220, a redundancy removing part 230, a database management part 240, a communication part 250 and a control part 260, wherein the database management part 240 may include a panoramic image database 241 and an object image database 242. In accordance with an example embodiment of the present invention, at least some of the location specifying part 210, the identical object recognition part 220, the redundancy removing part 230, the database management part 240, the communication part 250 and the control part 260 may be program modules communicating with the user terminal 300. The program modules may be included in the image matching system 200 in a form of an operating system, an application program module and other program module and may be also stored on several memory devices physically. Furthermore, the program modules may be stored on remote memory devices communicable to the image matching system 200. The program modules may include but not be subject to a routine, a subroutine, a program, an object, a component, and a data structure for executing a specific operation or a type of specific abstract data that will be described in accordance with the present invention.

First of all, in accordance with an example embodiment of the present invention, the location specifying part 210 may perform a function of specifying shooting places of multiple panoramic images by referring to coordinates, i.e., latitude, longitude and altitude, of the places where the panoramic images were taken. In accordance with an example embodiment of the present invention, the respective panoramic images and the corresponding coordinates of their shooting places (latitude, longitude and altitude) may be stored onto the panoramic image database 241.

Figure 3:
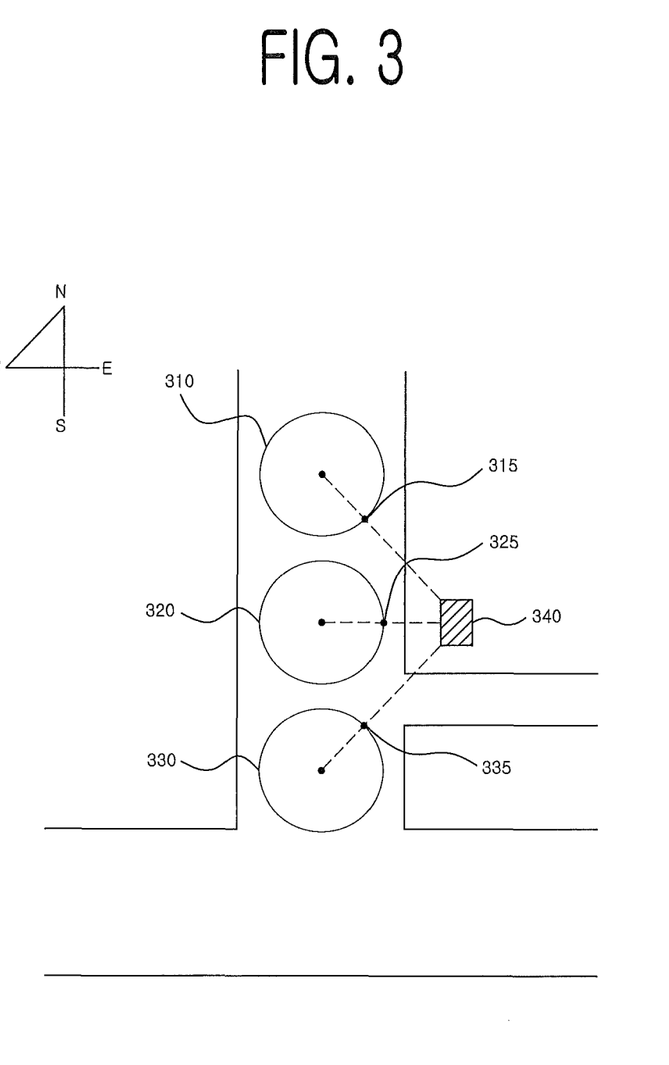
FIG. 3 is a diagram showing location relationships among panoramic images shot in different places in accordance with an example embodiment of the present invention.

FIG. 3 is an exemplary diagram illustrating the location relationships among panoramic images shot in different places in accordance with an example embodiment of the present invention.

By referring to FIG. 3, three panoramic images 310, 320 and 330 in accordance with an example embodiment of the present invention are shot in three different places. Herein, the respective locations of the three panoramic images may be specified by the coordinates of the respective shooting places.

In accordance with an example embodiment of the present invention, the identical object recognition part 220 may perform a function of recognizing each object, e.g., a building, etc., respectively included in each of at least two panoramic images as the same object by referring to directions to which respective objects are located with the respective specified shooting places of the panoramic images as reference points.

In accordance with an example embodiment of the present invention, the object recognition process is more specifically explained as follows: First, whether an object A is included in each of multiple panoramic images or not is determined. Herein, whether the object A is included only in panoramic images shot around the place where the object A is located may be considered to enhance the efficiency of object recognition. The panoramic images shot around the place where the object A is located may be selected by referring to the coordinates of the shooting places of the panoramic images. Next, directions of the object A from the respective shooting places of the panoramic images are measured. Thereafter, whether the objects, which seem to be the object A, included in each of the n panoramic images are the same as the real object A or not is identified by referring to the coordinates of the shooting places of the n panoramic images and the directions of the object A.

For instance, by referring to FIG. 3, it may be assumed that first, second and third panoramic images 310, 320 and 330 have been shot on a first road straight from north to south and the shooting places are located on the same longitudinal line along the first road and an object A 340 is located east on the same latitude from the shooting place of the second panoramic image. In the case, the object A may be displayed to be located (i) in the southeast 315 from the shooting place of the first panoramic image 310 on the first panoramic image 310, (ii) in the east 325 from that of the second panoramic image 320 on the second panoramic image 320; and (iii) in the northeast 335 from that of the third panoramic image 330 on the third panoramic image 330. Therefore, the identical object recognition part 220 in accordance with an example embodiment of the present invention may determine the respective objects, which look like the real object A, included in the first through third panoramic images is the real object A 340 by referring to the coordinates of the three panoramic images and the directions of the object A 340 displayed thereon.

As mentioned above, to recognize the respective objects displayed on the multiple panoramic images acquired as a result of shooting the object A at different angles and from different distances as the real object A, an object recognition technology may be adopted. As the object recognition technology in accordance with an example embodiment of the present invention, an article titled "A Comparison of Affine Region Detectors" authored jointly by K. MIKOLAJCZYK and seven others and published in "International Journal of Computer Vision" in November 2005 and the like may be referred to (The whole content of the article may be considered to have been combined herein). To recognize the respective objects shot at different angles as the same object more precisely, the aforementioned article describes how to detect an affine invariant region. Of course, the object recognition technology applicable to the present invention is not limited only to the method described in the article and it will be able to reproduce the present invention by applying various examples.

In accordance with an example embodiment of the present invention, the redundancy removing part 230 may perform a function of extracting the images of respective specific objects, recognized as the identical object by the identical object recognition part 220, included in the multiple panoramic images and determining only an image (s) including the features of the specific object precisely among the extracted images of the specific object as a reference image (s) for the specific object, wherein the reference image (s) including the features of the object precisely means an image (s) that includes the feature points of the object as the bases for image matching more precisely in comparison with other images, and in other words, an image (s) which is expected to have degrees of precision or fidelity exceeding a prefixed level in the image matching process if it is used as the reference image for the image matching process, i.e., a process for retrieving an image (s) including what is similar to an object included in an queried image. For instance, the reference image (s) may be an image (s) which includes a high-resolution image of an object, an image in which the object is largest, an image where the region on the front of the object takes the biggest percentage thereof, an image containing many features of the object, etc. but it is not limited only to this. The reference image (s) herein may be a concept of a panoramic image (s) including the specific object, an image (s) acquired as a result of extracting a region falling under the specific object from the panoramic image (s) or other various examples.

Figure 4:
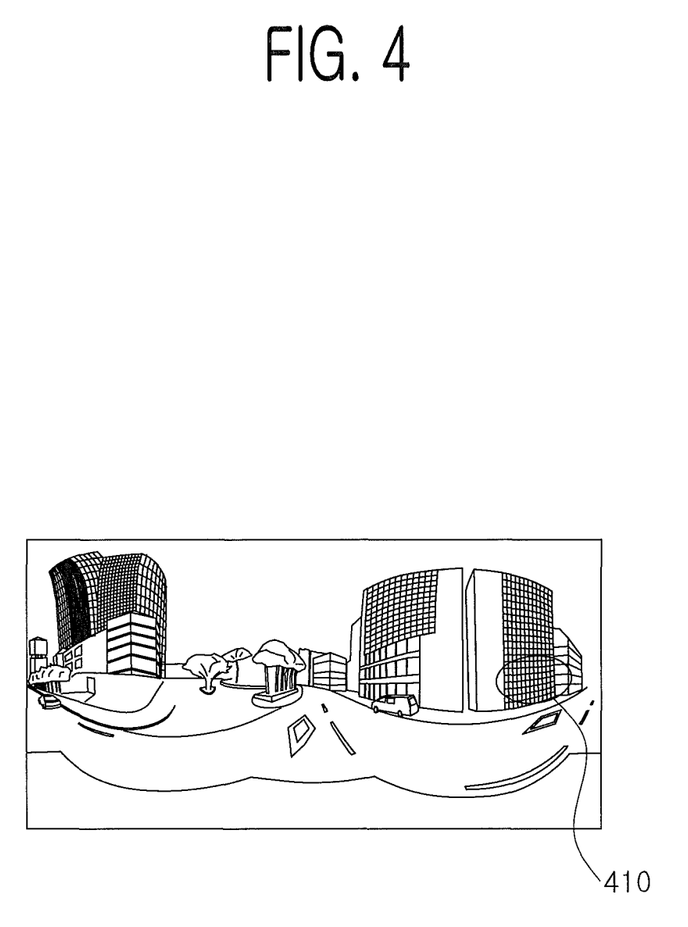
FIGS. 4 through 6 are diagrams visually illustrating 1st through 3rd panoramic images shot in different places respectively as depicted in FIG. 3 in accordance with an example embodiment of the present invention.
Figure 5:
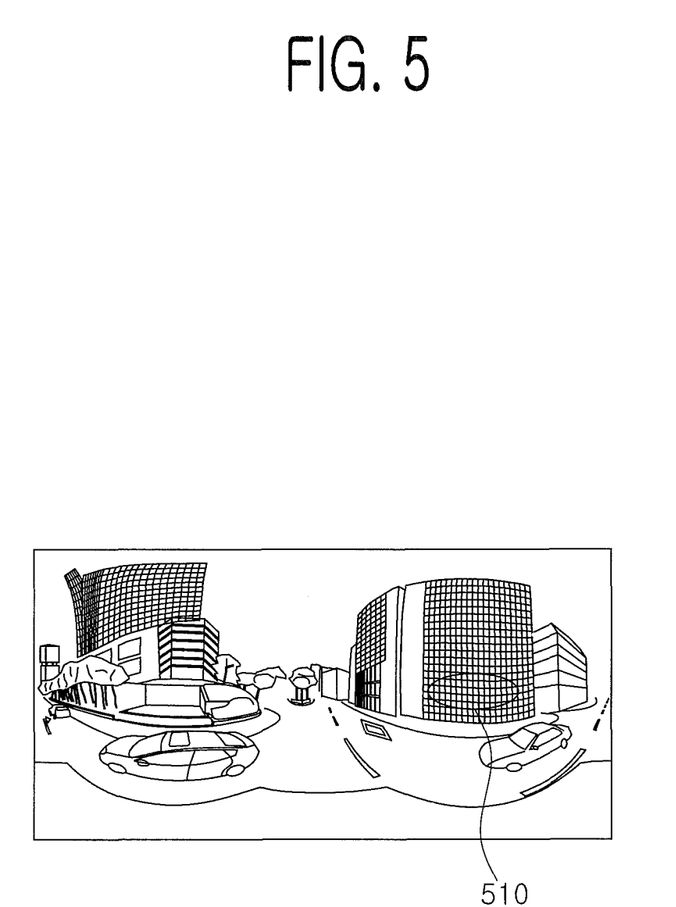
Figure 6:
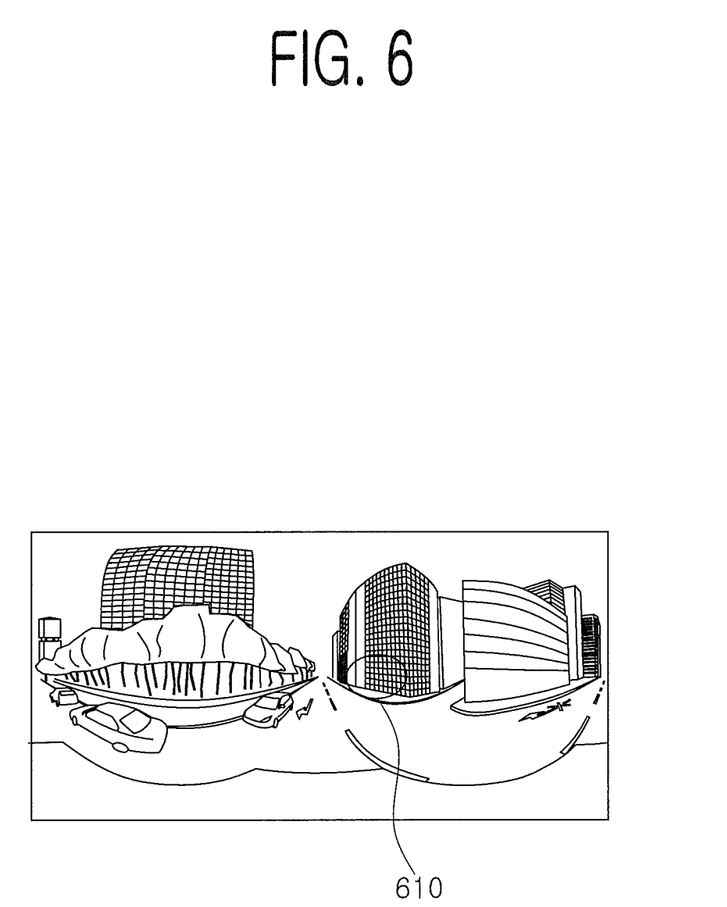

FIGS. 4 through 6 are exemplarily illustrate the first through third panoramic images at the respective shooting places as shown in FIG. 3 in accordance with an example embodiment of the present invention.

An image 410 of the object A included in the first panoramic image of FIG. 4 does not have the features of the object A therein precisely because it shows the side view of the object A and an image 610 of the object A included in the third panoramic image of FIG. 6 also does not have the features of the object A therein precisely because it also shows the side view of the object A. But an image 510 of the object A included in the second panoramic image of FIG. 5 has the complete front view of the object A so that the second panoramic image may have the features of the object A therein most precisely among the three panoramic images. Therefore, the redundancy removing part 230 in accordance with an example embodiment of the present invention may determine, as a reference image of the object A, the image 510 of the object A included in the second panoramic image of FIG. 5 among the images 410, 510 and 610 of the object A in the first through the third panoramic images of FIGS. 4 through 6.

Furthermore, the redundancy removing part 230 in accordance with an example embodiment of the present invention may carry out a function of storing only an image(s) determined as a reference image of an object onto the object image database 242 and saving storage space by preventing other images, which do not have the features of the object therein accurately and precisely, from being stored onto the object image database 242. A substance(s) to be stored onto the object image database 242 herein may be a reference image(s) of an object itself, or information on features of the object extracted from the reference image(s). Hence, in the aforementioned instances of FIGS. 4 through 6, the redundancy removing part 230 in accordance with an example embodiment of the present invention may store the image 510 of the object A included in the second panoramic image of FIG. 5, i.e., only the reference image, onto the object image database 242 and may not store the images 410 and 610 of the object A included in the first and the third panoramic images.

Herein, the object image database 242 in the present invention is a concept of a database (s) not only in a narrow meaning but also in a broad meaning which includes data records, etc. based on computer file systems. From the aspect, it must be understood that, even a set of simple operation processing logs may be the database (s) in the present invention if data can be extracted from the set. The image databases 241 and 242 are illustrated in FIG. 2 as if they are included in the image matching system 200, but they may be possibly configured separately from the image matching system 200 at the necessity of those skilled in the art who implement the present invention.

As shown above, in accordance with the present invention, it will be possible to save storage space and reduce the execution time for the image matching process by storing only an image (s) considered to have high degree (s) of precision or fidelity in the image matching process among multiple images as a reference image (s).

In accordance with an example embodiment of the present invention, the reference image (s) stored on the reference image database 242 may be used usefully during the course of visual search by using the image matching algorithm. More specifically, the image matching system 200 in accordance with the present invention may additionally include a query performing part (not illustrated) for comparing an image of an object B if inputted as a query with various reference images for various objects (and/or their features) stored in the reference image database 242 and providing, as a result of the query, a specific reference image (s) determined to include a specific object identical or similar to the object B by referring to the result of the image matching process.

In accordance with an example embodiment of the present invention, the communication part 250 may perform a function of instructing the image matching system 200 to communicate with an external device such as the user terminal 300.

In accordance with an example embodiment of the present invention, the control part 260 may perform a function of controlling data flow among the location specifying part 210, the identical object recognition part 220, the redundancy removing part 230, the database management part 240 and the communication part 250. In other words, the control part 260 may control the flow of data from outside or among the components of the image matching system 200 to allow the location specifying part 210, the identical object recognition part 220, the redundancy removing part 230, the database management part 240 and the communication part 250 to perform their unique functions.

In accordance with the present invention, in order to perform visual search efficiently by using panoramic images, it is possible to remove redundancy of images of a specific object (s) included in multiple panoramic images shot from different angles and use only a specific image(s) which shows the features of the specific object more precisely for the image matching process to thereby achieve effects of saving database storage space and dramatically reducing the execution time for the image matching process.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for removing redundancy of panoramic images comprising the steps of:
   (a) specifying respective locations of multiple panoramic images by referring to respective shooting places of the multiple panoramic images;
   (b) recognizing a specific object included in each of at least two panoramic images as being the same object by referring to the respective locations of the multiple panoramic images and respective directions of the specific object therein; and
   (c) determining at least one image of the specific object to be a reference image for the specific object, wherein the determined at least one image has the highest degree of precision in an image matching process among all the object images which are recognized as the specific object,
   wherein, at the step (b), if a first object considered as the specific object in a first panoramic image is displayed on a half line stretched from a shooting place of the first panoramic image to a location of the first object and a second object considered as the specific object in a second panoramic image is displayed on a half line stretched from a shooting place of the second panoramic image to a location of the second object, the first object and the second object are finally determined to be the same specific object.

2. The method of claim 1, wherein each panoramic image expresses a complete view from each shooting place on a virtual celestial sphere whose center is the shooting place.

3. The method of claim 1, wherein the locations of the multiple panoramic images are defined by at least one geographical parameter including latitude, longitude and altitude.

4. The method of claim 1, wherein, at the step (b), the directions of the specific object are measured with the respective shooting places of the multiple panoramic images as reference points.

5. The method of claim 1, wherein, at the step (c), the degrees of precision are determined by referring to at least one of the following parameters: a resolution of the specific object displayed on the object images, a size of the specific object, a percentage of the front view of the specific object, and a number of features of the specific object.

6. The method of claim 1, wherein the reference image(s) is at least one of a panoramic image(s) with the specific object and an image(s) created as a result of extracting a region falling under the specific object from the panoramic image(s).

7. The method of claim 1, further comprising the step of:
(d) storing only the determined reference image(s) as an image(s) for the specific object onto a certain database.

8. The method of claim 1, further comprising the step of:
(d) matching an image of a certain object, if inputted as a query, with at least one of various reference images for various objects and providing the matched reference image(s) thereamong as a search result of the query by referring to the matching result.

9. A system for removing redundancy of panoramic images, comprising:
a location specifying part for specifying respective locations of multiple panoramic images by referring to respective shooting places of the multiple panoramic images;
an identical object recognition part for recognizing a specific object included in each of at least two panoramic images as being the same object by referring to the respective locations of the multiple panoramic images and respective directions of the specific object therein, and
a redundancy removing part for determining at least one image of the specific object to be a reference image for the specific object, wherein the determined at least one image has the highest degree of at least one image of the specific object,
wherein, if a first object considered as the specific object in a first panoramic image is displayed on a half line stretched from a shooting place of the first panoramic image to a location of the first object and a second object considered as the specific object in a second panoramic image is displayed on a half line stretched from a shooting place of the second panoramic image to a location of the second object, the identical object recognition part finally determines the first object and the second object to be the same specific object.

10. The system of claim 9, wherein each panoramic image expresses a complete view from each shooting place on a virtual celestial sphere whose center is the shooting place.

11. The system of claim 9, wherein the locations of the multiple panoramic images are defined by at least one geographical parameter including latitude, longitude and altitude.

12. The system of claim 9, wherein the identical object recognition part measures the directions of the specific object with the respective shooting places of the multiple panoramic images as reference points.

13. The system of claim 9, wherein the redundancy removing part determines the top n object images determined to have the top n degrees of precision in the image matching process as the reference image(s) by referring to at least one of the following parameters: a resolution of the specific object displayed on the object images, a size of the specific object, a percentage of the front view of the specific object, and a number of features of the specific object.

14. The system of claim 9, wherein the reference image(s) is at least one of a panoramic image(s) with the specific object and an image(s) created as a result of extracting a region falling under the specific object from the panoramic image(s).

15. The system of claim 9, further comprising: a reference image database for storing only the determined reference image(s) as an image(s) for the specific object thereonto.

16. The system of claim 9, further comprising: a query performing part for matching an image of a certain object, if inputted as a query, with at least one of various reference images for various objects and providing the matched reference image(s) thereamong as a search result of the query by referring to the matching result.

17. A non-transitory computer readable medium having recorded thereon a computer readable program to execute the method of claim 1.

\* \* \* \* \*